(12) United States Patent
Bourbonnais et al.

(10) Patent No.: US 9,727,625 B2
(45) Date of Patent: Aug. 8, 2017

(54) PARALLEL TRANSACTION MESSAGES FOR DATABASE REPLICATION

(71) Applicant: International Business Machines Corporation, Armonk, NY (US)

(72) Inventors: Serge Bourbonnais, Palo Alto (CA); Austin F. M. D'costa, Beaverton, OR (US); Somil Kulkarni, San Jose, CA (US); Yat On Lau, San Jose, CA (US); Jonathan W. Wierenga, Lower Hutt (NZ)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 382 days.

(21) Appl. No.: 14/156,602

(22) Filed: Jan. 16, 2014

(65) Prior Publication Data

US 2015/0199415 A1    Jul. 16, 2015

(51) Int. Cl.
G06F 17/30    (2006.01)

(52) U.S. Cl.
CPC .. *G06F 17/30578* (2013.01); *G06F 17/30575* (2013.01); *G06F 17/30581* (2013.01)

(58) Field of Classification Search
CPC ......... G06F 17/30575; G06F 17/30578; G06F 17/30581
USPC ........................................................ 707/615
See application file for complete search history.

(56) References Cited

U.S. PATENT DOCUMENTS

| 4,620,276 A | 10/1986 | Daniell et al. |
| 4,631,673 A | 12/1986 | Haas et al. |
| 4,646,229 A | 2/1987 | Boyle |
| 4,648,036 A | 3/1987 | Gallant |

(Continued)

FOREIGN PATENT DOCUMENTS

EP    0674260 B1    8/2002

OTHER PUBLICATIONS

Final Office Action mailed Oct. 28, 2010 for U.S. Appl. No. 12/049,196; 14 pages.

(Continued)

*Primary Examiner* — Mark E Hershley
(74) *Attorney, Agent, or Firm* — Susan Murray;SVL IPLAW

(57) ABSTRACT

According to one embodiment of the present invention, a system uses parallel transaction messages for database replication. The system receives transaction messages from a source system via a plurality of parallel send queues in a receive queue. Each transaction message includes a message identifier indicating a commit order for that transaction. The system reads transaction messages in the receive queue in order in which they were committed against a source database based on the message identifier, and applies changes described by the transaction messages to a target database. Two or more transaction messages in the receive queue are applied to the target database in parallel. The system deletes transaction messages from the receive queue asynchronously to applying changes described by those transaction messages to the target database. Embodiments of the present invention further include a method and computer program product for parallel transaction messages in substantially the same manners described above.

18 Claims, 5 Drawing Sheets

(56) References Cited

U.S. PATENT DOCUMENTS

| | | | |
|---|---|---|---|
| 4,677,644 A * | 6/1987 | Lacroix | G08C 19/28 340/12.15 |
| 4,727,540 A * | 2/1988 | Lacroix | G08C 19/28 370/522 |
| 4,853,843 A | 8/1989 | Ecklund | |
| 5,212,772 A | 5/1993 | Masters | |
| 5,506,962 A | 4/1996 | Orimo et al. | |
| 5,737,738 A | 4/1998 | Sharman | |
| 5,758,333 A | 5/1998 | Bauer et al. | |
| 5,787,247 A | 7/1998 | Norin et al. | |
| 5,791,769 A | 8/1998 | Yang | |
| 5,806,075 A | 9/1998 | Jain et al. | |
| 5,832,514 A | 11/1998 | Norin et al. | |
| 5,884,324 A | 3/1999 | Cheng et al. | |
| 5,890,154 A | 3/1999 | Hsiao et al. | |
| 5,894,567 A | 4/1999 | Dodd et al. | |
| 5,916,307 A | 6/1999 | Piskiel et al. | |
| 5,920,860 A | 7/1999 | Maheshwari et al. | |
| 5,991,768 A | 11/1999 | Sun et al. | |
| 5,995,980 A | 11/1999 | Olson et al. | |
| 6,006,267 A | 12/1999 | Nguyen et al. | |
| 6,029,177 A | 2/2000 | Sadiq et al. | |
| 6,029,178 A | 2/2000 | Martin et al. | |
| 6,058,389 A | 5/2000 | Chandra et al. | |
| 6,058,401 A | 5/2000 | Stamos et al. | |
| 6,061,689 A | 5/2000 | Chang et al. | |
| 6,067,541 A | 5/2000 | Raju et al. | |
| 6,073,140 A | 6/2000 | Morgan et al. | |
| 6,081,689 A | 6/2000 | Houston et al. | |
| 6,092,220 A | 7/2000 | Palmer et al. | |
| 6,105,017 A | 8/2000 | Kleewein et al. | |
| 6,122,630 A | 9/2000 | Strickler et al. | |
| 6,138,124 A | 10/2000 | Beckhardt | |
| 6,144,966 A | 11/2000 | Roberts | |
| 6,154,847 A | 11/2000 | Schofield et al. | |
| 6,202,149 B1 | 3/2001 | Hedegard | |
| 6,209,000 B1 | 3/2001 | Klein et al. | |
| 6,253,211 B1 | 6/2001 | Gillies et al. | |
| 6,301,589 B1 | 10/2001 | Hirashima et al. | |
| 6,335,937 B1 | 1/2002 | Chao et al. | |
| 6,338,092 B1 | 1/2002 | Chao et al. | |
| 6,343,219 B1 | 1/2002 | Wada | |
| 6,353,834 B1 | 3/2002 | Wong et al. | |
| 6,412,017 B1 | 6/2002 | Straube et al. | |
| 6,438,558 B1 | 8/2002 | Stegelmann | |
| 6,446,144 B1 | 9/2002 | Habusha et al. | |
| 6,466,950 B1 | 10/2002 | Ono | |
| 6,490,595 B1 | 12/2002 | Candee et al. | |
| 6,526,417 B1 | 2/2003 | Perry | |
| 6,594,676 B1 | 7/2003 | Moore | |
| 6,615,223 B1 | 9/2003 | Shih et al. | |
| 6,622,152 B1 | 9/2003 | Sinn et al. | |
| 6,668,260 B2 | 12/2003 | Zoltan | |
| 6,738,082 B1 | 5/2004 | Dong et al. | |
| 6,763,352 B2 | 7/2004 | Cochrane et al. | |
| 6,865,160 B1 | 3/2005 | Bare | |
| 6,889,231 B1 | 5/2005 | Souder et al. | |
| 6,934,727 B2 | 8/2005 | Berkowitz et al. | |
| 6,973,463 B2 | 12/2005 | Merrells et al. | |
| 6,973,464 B1 | 12/2005 | Gao | |
| 6,976,022 B2 | 12/2005 | Vemuri et al. | |
| 6,993,539 B2 | 1/2006 | Federwisch et al. | |
| 7,003,531 B2 | 2/2006 | Holenstein et al. | |
| 7,031,974 B1 | 4/2006 | Subramaniam | |
| 7,069,295 B2 | 6/2006 | Sutherland et al. | |
| 7,072,911 B1 | 7/2006 | Doman et al. | |
| 7,076,481 B2 | 7/2006 | Osborne et al. | |
| 7,076,508 B2 | 7/2006 | Bourbonnais et al. | |
| 7,085,764 B2 | 8/2006 | Bangel et al. | |
| 7,203,687 B2 | 4/2007 | Adiba et al. | |
| 7,203,712 B2 | 4/2007 | Adiba et al. | |
| 7,240,054 B2 | 7/2007 | Adiba et al. | |
| 7,287,043 B2 | 10/2007 | Lindsay et al. | |
| 7,330,860 B2 | 2/2008 | Adiba et al. | |
| 7,398,285 B2 | 7/2008 | Kisley | |
| 7,454,551 B2 | 11/2008 | Myers | |
| 7,490,083 B2 | 2/2009 | Bourbonnais | |
| 7,685,569 B2 | 3/2010 | Basheer | |
| 7,707,177 B2 * | 4/2010 | Bank | G06F 17/30581 707/617 |
| 8,341,134 B2 * | 12/2012 | Bourbonnais | G06F 17/30578 707/703 |
| 8,352,425 B2 | 1/2013 | Bourbonnais | |
| 8,392,387 B2 * | 3/2013 | Bourbonnais | G06F 17/30578 707/703 |
| 8,473,953 B2 | 6/2013 | Bourbonnais | |
| 8,688,634 B2 | 4/2014 | Beyer et al. | |
| 9,244,996 B2 | 1/2016 | Bourbonnais et al. | |
| 2001/0037398 A1 | 11/2001 | Chao et al. | |
| 2001/0055274 A1 | 12/2001 | Hegge et al. | |
| 2002/0049776 A1 | 4/2002 | Aronoff et al. | |
| 2002/0145761 A1 | 10/2002 | Ikeda | |
| 2002/0152362 A1 | 10/2002 | Cochran | |
| 2002/0156761 A1 | 10/2002 | Chen et al. | |
| 2002/0165724 A1 | 11/2002 | Blankesteijn | |
| 2002/0188624 A1 | 12/2002 | Landin et al. | |
| 2003/0041074 A1 | 2/2003 | Vasudevan et al. | |
| 2003/0084373 A1 * | 5/2003 | Phelps | G06F 11/2023 714/16 |
| 2003/0088589 A1 | 5/2003 | Good et al. | |
| 2003/0154238 A1 | 8/2003 | Murphy et al. | |
| 2003/0158798 A1 | 8/2003 | Green | |
| 2003/0177194 A1 | 9/2003 | Crocker et al. | |
| 2003/0182319 A1 | 9/2003 | Morrison | |
| 2003/0187857 A1 | 10/2003 | Ford | |
| 2003/0188035 A1 | 10/2003 | Lubbers et al. | |
| 2003/0208511 A1 | 11/2003 | Earl et al. | |
| 2004/0024771 A1 | 2/2004 | Jain et al. | |
| 2004/0162859 A1 | 8/2004 | Guo et al. | |
| 2004/0250032 A1 | 12/2004 | Ji et al. | |
| 2005/0044088 A1 | 2/2005 | Lindsay et al. | |
| 2005/0102295 A1 | 5/2005 | Murray et al. | |
| 2005/0108621 A1 | 5/2005 | Kim et al. | |
| 2005/0114285 A1 | 5/2005 | Cincotta | |
| 2005/0149578 A1 | 7/2005 | Sustman et al. | |
| 2005/0192989 A1 | 9/2005 | Adiba et al. | |
| 2005/0193024 A1 | 9/2005 | Beyer et al. | |
| 2005/0193037 A1 | 9/2005 | Adiba et al. | |
| 2005/0193039 A1 | 9/2005 | Adiba et al. | |
| 2005/0193040 A1 | 9/2005 | Adiba et al. | |
| 2005/0193041 A1 | 9/2005 | Bourbonnais et al. | |
| 2005/0193093 A1 | 9/2005 | Mathew et al. | |
| 2005/0223163 A1 | 10/2005 | Ogasawara et al. | |
| 2005/0262055 A1 | 11/2005 | Newport | |
| 2006/0031286 A1 | 2/2006 | Sagawa | |
| 2006/0222161 A1 * | 10/2006 | Bank | G06F 17/30581 379/221.08 |
| 2006/0294333 A1 | 12/2006 | Michaylov et al. | |
| 2007/0067313 A1 | 3/2007 | Garza et al. | |
| 2007/0083569 A1 | 4/2007 | Wong et al. | |
| 2007/0288537 A1 | 12/2007 | Bourbonnais et al. | |
| 2008/0098044 A1 | 4/2008 | Todd | |
| 2008/0163222 A1 | 7/2008 | Bourbonnais et al. | |
| 2009/0037398 A1 | 2/2009 | Horvitz et al. | |
| 2009/0132671 A1 | 5/2009 | Chkodrov et al. | |
| 2010/0161743 A1 | 6/2010 | Krishnamurthi et al. | |
| 2011/0010460 A1 * | 1/2011 | Lavoie | G06Q 40/04 709/231 |
| 2012/0023369 A1 | 1/2012 | Bourbonnais et al. | |
| 2012/0150829 A1 * | 6/2012 | Bourbonnais | G06F 17/30578 707/703 |
| 2012/0191680 A1 * | 7/2012 | Bourbonnais | G06F 17/30578 707/703 |
| 2012/0303576 A1 * | 11/2012 | Calder | G06F 11/2076 707/611 |
| 2012/0303577 A1 * | 11/2012 | Calder | G06F 11/2074 707/613 |
| 2015/0199415 A1 * | 7/2015 | Bourbonnais | G06F 17/30578 707/615 |

(56) References Cited

U.S. PATENT DOCUMENTS

2016/0210344 A1 7/2016 Bourbonnais et al.

OTHER PUBLICATIONS

Interview Summary mailed Sep. 9, 2010 for U.S. Appl. No. 12/049,196; 3 pages.
Appeal Brief filed Mar. 22, 2011, U.S. Appl. No. 12/049,196, 21 pages.
http://dbforums.com/arch/69/2002/12/634367, 2002, 2 pages.
Bernstein, Philip A., et al., "Context-based prefetch—an optimization for implementing objects on relations", VLDB Journal, 2000, pp. 177-189.
Carino, Jr., Felipe; et al., "StorHouse Metanoia—New Applications for Database, Storage & Data Warehousing", Storage & Data Warehousing, 2001, pp. 521-531.
Gao, Lei et al., "Application Specific Data Replication for Edge Services", May 2003, ACM Press, pp. 449-460.
Haritsa, Javant R. , et al., "Value-Based Scheduling in Real-Time Database Systems", VLDB Journal, 2 117-152, 1993, pp. 117-126.
Haskin, Roger, et al., "Recovery Management in QuickSilver", Feb. 1988, ACM Press, vol. 6, issue 1, pp. 82-108.
Jennings, Roger, "SQL Server 2000 Gains on Oracle", Visual Basic Programmer's Journal, vol. 10, 2000, pp. 20-29.
O'Connell, William, et al., "Optimizer and Parallel Engine Extensions for Handling Expensive Methods Based on Large Objects", IEEE, 1999, pp. 304-313.
Pu, Calton, et al., "Replica Control in Distributed Systems: An Asynchronous Approach", Apr. 1991, ACM Press, vol. 20, issue 2, pp. 377-386.
Stacey, Doug "Replication: D82, Oracle, or Sybase?", Dec. 1995, ACM Sigmod record, vol. 24, issue 4, pp. 95-101.
Dimitrios Georgakopoulos et al., Chronological Scheduling of Transactions with Temporal Dependencies, Dec. 30, 1990, 28 pages.
Miled, Zina Ben, "Global Change Master Directory: Object-Oriented Active Asynchronous Transaction Management in a Federated Environment Using Data Agents," ACM 2001, pp. 207-214.
Wolanow, A. "One Enterprise, One Interface," Intelligent Enterprise, vol. 2, No. 4, Mar. 9, 1999, 1 page.
Yu, Haifeng et al., "Design and Evaluation of a Conit-Based Continuous Consistency Model for Replicated Services," ACM 2002, vol. 20, No. 3, pp. 239-282.
Notice of Allowance mailed Sep. 26, 2012 for U.S. Appl. No. 13/437,198, 12 pages.
Response to Office Action filed with the USPTO on Sep. 18, 2012 for U.S. Appl. No. 13/437,198, 6 pages.
Office Action mailed Jan. 17, 2012 for U.S. Appl. No. 12/049,196; 6 pages.
Petition to Revive, RCE and Response to Final Office Action filed Dec. 23, 2011 for U.S. Appl. No. 10/788,556; 41 pages.
Office Action mailed May 7, 2012 for U.S. Appl. No. 12/964,807; 22 pages.
Response to Office Action filed Apr. 11, 2012, U.S. Appl. No. 12/049,196, 12 pages.
Interview Summary dated Aug. 7, 2012 for U.S. Appl. No. 12/964,807; 3 pages.
Notice of Allowance mailed Jun. 11, 2012 for U.S. Appl. No. 12/049,196; 15 pages.
Notice of Allowance mailed Aug. 16, 2012 for U.S. Appl. No. 12/964,807; 10 pages.
Office Action mailed Jun. 20, 2012 for U.S. Appl. No. 13/437,198; 27 pages.
Response to Office Action filed with the USPTO on Aug. 6, 2012 for U.S. Appl. No. 12/964,807, 10 pages.
Kumar-Chatterjee, Pav, "Q Replication Components in IBM Replication Server", Enterprise Articles IBM, Aug. 2010, 9 pages.
Response to Office Action filed Oct. 22, 2010 for U.S. Appl. No. 11/771,801; 19 pages.
Interview Summary mailed Mar. 2, 2012 for U.S. Appl. No. 11/771,801; 2 pages.
Office Action mailed Mar. 8, 2012 for U.S. Appl. No. 11/771,801; 16 pages.
U.S. Appl. No. 11/771,801, Pre-Appeal Brief Conference Arguments filed Jun. 6, 2012, 5 pages.
Appeal Brief filed with the USPTO on Sep. 27, 2012 for U.S. Appl. No. 11/771,801; 23 pages.
Notice of Panel Decision from Pre-Appeal Brief Review mailed Aug. 30, 2012 for U.S. Appl. No. 11/771,801; 2 pages.
Examiner's Answer mailed Dec. 10, 2012 for U.S. Appl. No. 11/771,801; 14 pages.
Interview Summary mailed Mar. 11, 2011 for U.S. Appl. No. 11/771,801; 4 pages.
Response to Final Office Action filed Mar. 29, 2011 for U.S. Appl. No. 11/771,801; 25 pages.
U.S. Appl. No. 10/789,775.
U.S. Appl. No. 11/771,801.
Final Office Action mailed Jan. 5, 2011 for U.S. Appl. No. 11/771,801; 29 pages.

* cited by examiner

PARALLEL TRANSACTION MESSAGES FOR DATABASE REPLICATION

BACKGROUND

1. Technical Field

Present invention embodiments relate to database replication, and more specifically, to out of order parallel data transmission for transaction-consistent, message-based database replication.

2. Discussion of the Related Art

Copies of information in a database (the "source database" or "source") may be maintained by reading the log of the source database to identify transactions that have been committed against it. These transactions can then be replayed against another database (the target database or target). Transactions are generally sent from the source to the target in commit order using a single queue of messages to ensure that the transactions applied against the target are equivalent to those applied against the source. However, transmitting messages from the source via a single channel can limit message throughput.

BRIEF SUMMARY

According to one embodiment of the present invention, a system uses parallel transaction messages for database replication. The system receives transaction messages from a source system via a plurality of parallel send queues in a receive queue. Each transaction message includes a message identifier indicating a commit order for that transaction. The system reads transaction messages in the receive queue in order in which they were committed against a source database based on the message identifier, and applies changes described by the transaction messages to a target database to replicate changes to the source database. Two or more transaction messages in the receive queue are applied to the target database in parallel. The system deletes transaction messages from the receive queue asynchronously to applying changes described by those transaction messages to the target database. Embodiments of the present invention further include a method and computer program product for parallel transaction messages in substantially the same manners described above.

BRIEF DESCRIPTION OF THE SEVERAL VIEWS OF THE DRAWINGS

Generally, like reference numerals in the various figures are utilized to designate like components.

DETAILED DESCRIPTION

Present invention embodiments relate to parallel data transmission for transaction-consistent, message-based database replication. Multiple send queues and transmission channels may be used to move messages containing database transactions from a source system to a single receive queue on a target system. A process on the target system may read messages from the receive queue and apply the transactions to a target database. To ensure transactional consistency, this process may determine the order in which the changes were made on the source system using message identifier sequence numbers. Non-dependent transactions may be applied to the target database in parallel. After changes are applied to the target database, the corresponding messages may be removed from the receive queue asynchronously.

One aspect of a present invention embodiment is to improve the rate at which transaction messages may be sent from a source database system to a target system. For example, the use of multiple send queues on the source system and multiple transmission channels to the target system may avoid contention between a process on the source system writing messages to a send queue and a process responsible for moving messages from the send queue to the transmission channel.

Another aspect is to prune messages containing transactions applied on the target system from the receive queue out of order without resorting to a two-phase-commit procedure between the target database and the message queuing system; that is, without having to incur the overhead of coordinating transactions against the target database with removal of the transaction message from the receive queue in a manner that is robust against failure of those operations. A further aspect is to handle resets of the message identifier sequence and overlaps of the message identifier sequence numbers in a manner that ensures all messages are processed.

Figure 1:
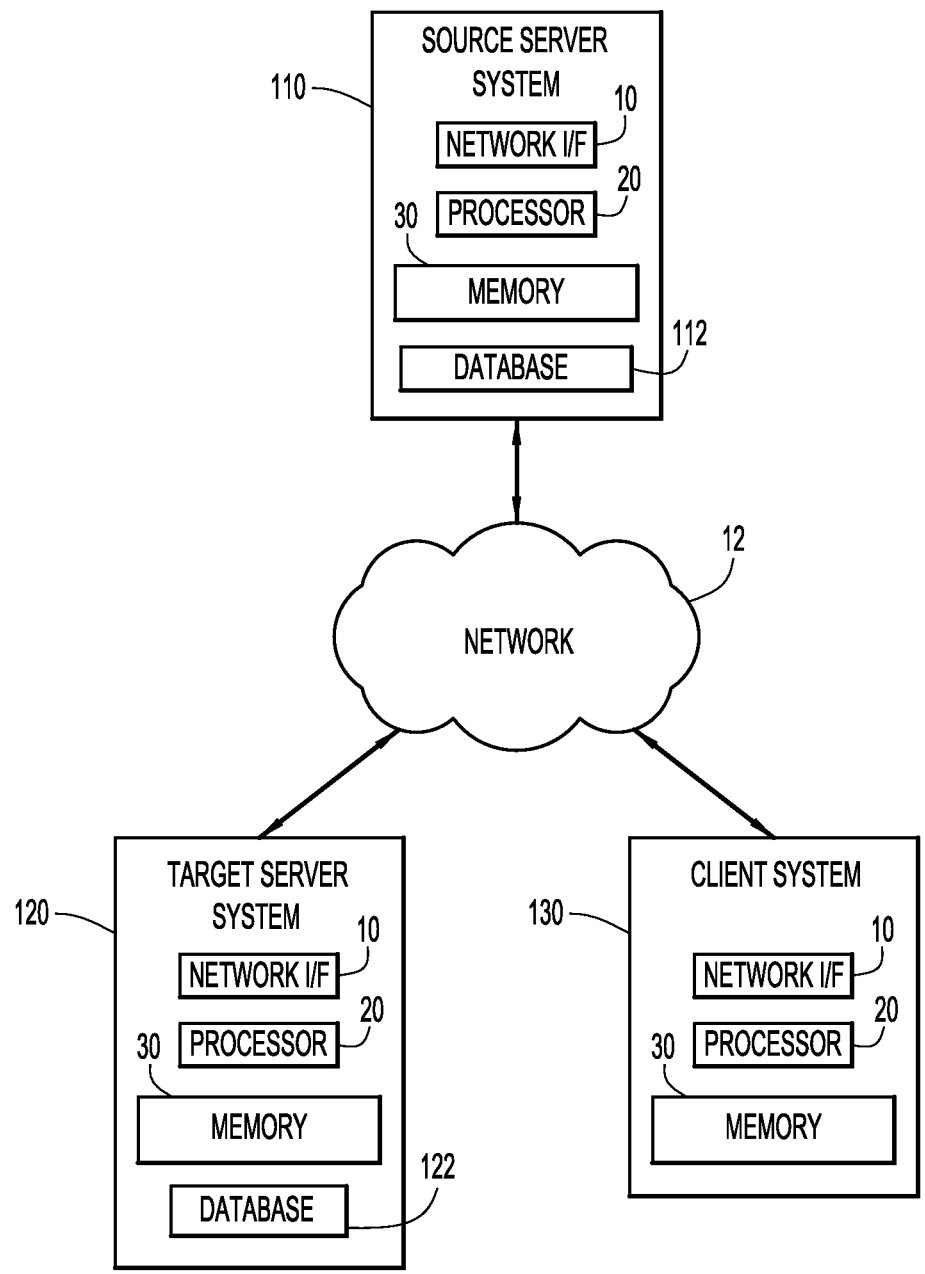
FIG. 1 is a diagrammatic illustration of an example computing environment for an embodiment of the present invention.

An example environment for present invention embodiments is illustrated in FIG. 1. Specifically, the environment includes one or more source server systems 110 and target server systems 120, and may include one or more client or end-user systems 130. Source server systems 110, target server systems 120, and client systems 110 may be remote from each other and communicate over a network 12. Transactions against a database 112 on a source server system are replicated against a database 122 on a target server system.

Network 12 may be implemented by any number of any suitable communications media (e.g., wide area network (WAN), local area network (LAN), Internet, intranet, etc.). Alternatively, any number of source server systems 110, target server systems 120, and client systems 130 may be local to each other, and communicate via any appropriate local communication medium (e.g., local area network (LAN), hardwire, wireless link, intranet, etc.).

Client systems 130 enable users to communicate with a database on the source and/or target system (e.g., via network 12). The client systems may present any graphical user (e.g., GUI, etc.) or other interface (e.g., command line prompts, menu screens, etc.) to receive commands from users and interact with the databases and/or other modules or services.

Source server systems 110, target server systems 120, and client systems 130 may be implemented by any conventional or other computer systems preferably equipped with a display or monitor, a base (e.g., including at least one processor 20, memories 30 and/or internal or external network interface or communications devices 10 (e.g., modem, network cards, etc.), optional input devices (e.g., a keyboard, mouse, or other input device), and may include any commercially available or custom software (e.g., database management system (DBMS) software, database client software, database log capture software, queue management software, networking software, etc.).

Source server systems 110 and target server systems 120 may include one or more modules or units to perform the various functions of present invention embodiments described below (e.g., capturing transactions from a database log, generating message identifiers, generating transaction messages, writing messages to queues, browsing messages in a queue, pruning or deleting messages from a queue, determining dependencies between transactions, replaying transactions based on a transaction message, reconstructing transaction order based on message sequence numbers, restarting processing on the target system, resetting message identifier sequence numbers, etc.), which may be implemented by any combination of any quantity of software and/or hardware modules or units, and may reside within memory 30 of a server system and/or client systems for execution by processor 20.

Figure 2:
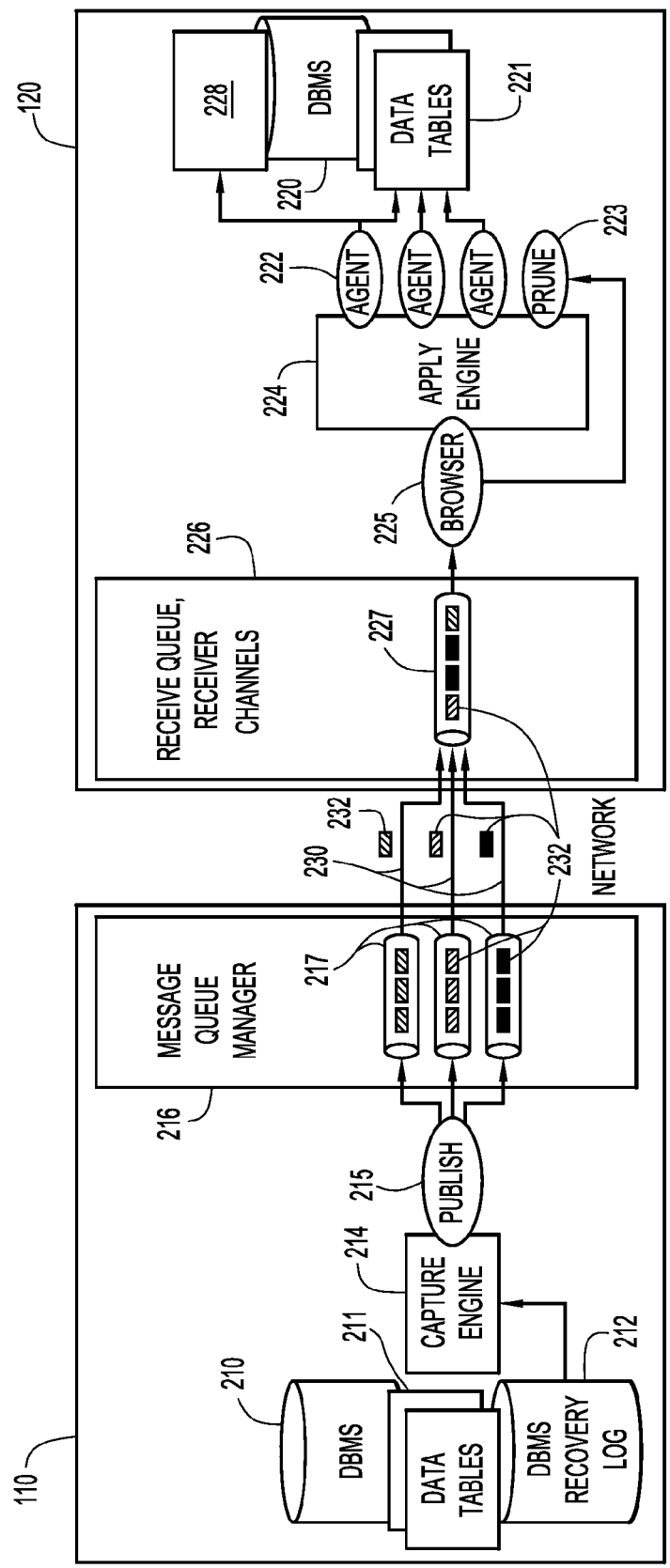
FIG. 2 is a block diagram of an example a database replication system using parallel transaction messages according to an embodiment of the present invention.

A block diagram of an example a database replication system using parallel transaction messages according to an embodiment of the present invention is illustrated in FIG. 2. Elements of this system may operate in a similar manner to conventional or other database replication system elements with respect to operations that do not depend on parallel transactions messages or the number of send queues and transmission channels. In particular, source server system 110 includes database management system (DBMS) 210; one or more data tables 211; DBMS log 212; capture engine 214, which includes publish thread 215; and message queue manager 216, which manages send queues 217. Target server system 120 includes message queue manager 226, which manages receive queue 227; apply engine 224, which includes browser thread 225, one or more agent threads 222, and prune thread 223; and DBMS 220, which manages data tables 221 and done message table 228. Capture engine 214 reads DBMS log 212 to identify committed changes to data tables 211, and writes messages 232 describing those changes to send queues 217. The messages are transferred from send queues 217 on the source server system to receive queue 227 on the target server system via transmission channels 230 by message queue managers 216 and 226. Apply engine 224 reads messages from the receive queue and replays the changes against data tables 221 of DBMS 220 on the target server system.

DBMS 210 may be a relational database management system that manages data tables 211 and writes records of those changes to DBMS log 212 (e.g., in response to structured query language (SQL) or other statements received from client system 130 via network 12). DBMS log 212 (e.g., a recovery log) contains sufficient information to reproduce the changes to data tables 211 and to identify dependencies between transactions. For example, entries in the log may include information indicating the transaction to which a change belongs, the table changed, the value of the key column(s) in the row changed, and old and new values of all columns of the changed row or new column values of a new row.

Capture engine 214 reads DBMS log 212 to identify transactions that DBMS 210 has committed against data tables 211, and sends messages describing those transactions to send queues 217. For example, to identify committed transactions, the capture engine may read the entries from the log in order, and add each entry to a list associated with the transaction to which the entry belongs. When the capture engine encounters a commit record for a transaction, it may build a message 232 describing that transaction (e.g., encoding the log entries in binary or other format) and send the message to one of the send queues 217. As a result, messages are built and dispatched to the send queues in the order in which the transactions they describe were committed against data tables 211. Only committed transactions are sent to the target server system for replay. For a large transaction, message 232 may be a logical message comprising a plurality of physical messages. After a successful write to a send queue, the capture engine may delete the in-memory list for that transaction.

Each message 232 includes a message identifier (referred to as msgid) generated by the capture engine. The msgid is used on the target server system for detecting lost messages and retrieving messages in commit order. The msgid includes a densely incrementing sequence number and a timestamp corresponding to the time at which the first message of the sequence was generated. For example, when the capture engine generates the first message 232 to write to send queues 217 after replication of database tables begins or restarts, it may set the timestamp to the current date/time and set the first sequence number to one. When the capture engine builds the next message 232 to write to the send queues, it increments the sequence number by one and uses the same timestamp as in the previous message.

The capture engine distributes messages 232 to send queues 217 (e.g., via publish thread 215). For example, the publish thread may distribute the messages to the queues in round-robin fashion, where the first n (e.g., 1, 5, 10, 100, etc.) messages are sent to a first send queue 217, the next n messages to a second queue, and so on. As a result, messages may be effectively batched in groups of consecutive dense msgid orders from different send queues.

Message queue managers 216 and 226 move messages from the send queues on the source server system to the receive queue on the target server system using transmission channels 230. The queue managers may be services providing storage for the queues and their messages and a communication and staging bridge between capture engine 214 and apply engine 224. The movement of messages from the source server system to the target server system is asynchronous to any work performed by either the capture engine or apply engine processes. The number of send queues may be user-configurable. Each send queue may have a corresponding transmission channel (e.g., TCP/IP connection). Each individual send queue delivers messages from the publish thread over a transmission channel on a first-in-first-out basis. However, messages from different send queues may be delivered to the receive queue in parallel. As a result, messages may arrive at the receive queue out of commit order. Message queue manager 226 provides a function with which the apply engine may retrieve messages from the receive queue in the order in which they were received by the receive queue (the browse-next function) and a function through which the apply engine may retrieve a message with a specified msgid (the lookup-by-msgid function). Message queue manager 226 may maintain an index of messages in the receive queue to facilitate retrieving messages by msgid.

Browser thread 225 of the apply engine, reads messages from the receive queue ordered by msgid (e.g., using the lookup-by-msgid interface if the number of send queues is greater than one, or using the browse-next interface otherwise), identifies messages corresponding to transactions that do not depend on a transaction that has not yet been replayed on the target server system, and adds those messages to a queue data structure (referred to as the work queue) within the apply engine. Messages read by the browser thread persist in the receive queue (even if the queue manager shuts down) until explicitly deleted.

The browser thread may determine whether a message describes a transaction that depends on a pending transaction by comparing the changes described in the transaction messages. For example, if a transaction message includes an insert or key update, the transaction is dependent if the new key value is the same as the old key value for a pending transaction.

Agent threads 222 asynchronously read messages from the work queue and apply the transactions to data tables 221 of DBMS 220. When an agent thread applies the changes described in a message, it also inserts the msgid for that message into done message table 228 in the same commit-scope as the transaction applied to data tables 221. After committing that transaction, the agent thread sends the msgid to browser thread 225 via a queue data structure (referred to as the done queue) within the apply engine. The browser thread receives the msgid, clears any dependencies of messages on that msgid, and sends the msgid to prune thread 223 via a queue data structure (referred to as the prune queue) within the apply engine.

Prune thread 223 receives the msgid and immediately deletes the message from the receive queue. As a result, messages are deleted from the receive queue in the order in which they were committed on the target server system (which may be different than the order in which these messages arrived from the source server system).

In addition, the prune thread asynchronously deletes entries from the done message table. The prune thread may delete messages from the done message table in batch to enhance performance. For example, from time to time, the prune thread may determine if a contiguous range of msgids equal to or greater than a predetermined batch size is present in the prune queue data structure. If so, the prune thread deletes the corresponding contiguous range of entries from the done message table and the done queue, excluding the highest entry. The highest msgid of the contiguous range is left in the done message table to facilitate restarting the apply engine after a shutdown, and is deleted as part of the next contiguous range.

Figure 3:
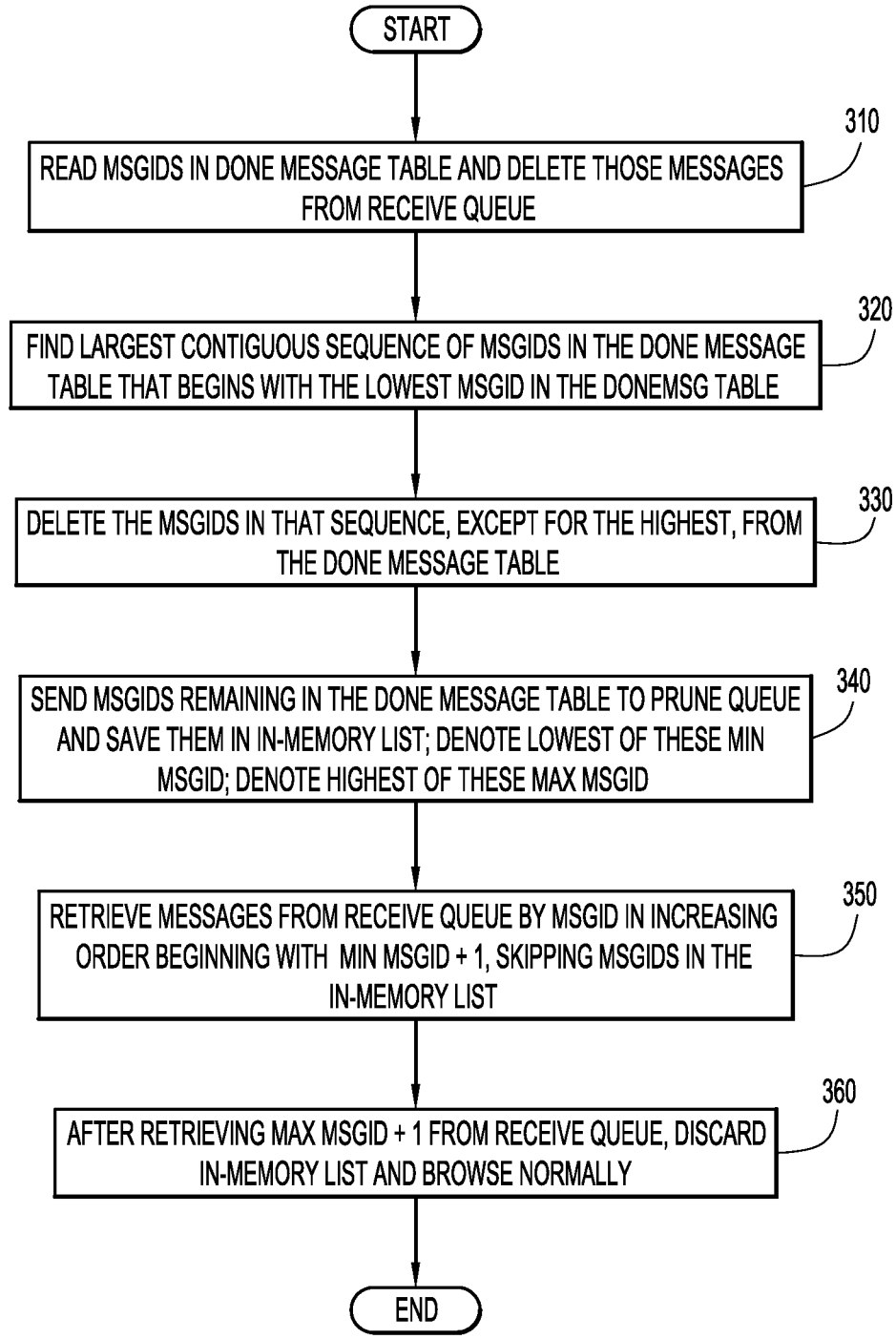
FIG. 3 is a flow diagram illustrating an example manner of starting or restarting an apply engine for a database replication system that uses parallel transaction messages according to an embodiment of the present invention.

An example manner of starting or restarting an apply engine for a database replication system that uses parallel transaction messages according to an embodiment of the present invention is illustrated in FIG. 3. Since the messages are pruned from the receive queue and the done message table asynchronously to application of the changes to data tables 221, the apply engine may use the information stored in the done message table to clean up and determine where to begin browsing. Initially, browser thread 225 reads the msgids stored in done message table 228 at step 310. The browser thread deletes those messages from the receive queue. Deleting the messages from the receive queue has no harmful effect for any messages that were deleted from the receive queue previously.

At step 320, the browser thread determines the largest contiguous sequence of msgids in the done message table that begins with the lowest msgid in the done message table, and at step 330 the browser thread deletes the msgids in that contiguous sequence, except for the highest, from the done message table. For example, if the done message table contains msgids with sequence numbers: 4, 5, 6, 8, 9, 10, 11, and 13. The lowest msgid is 4. The largest contiguous sequence that begins with the lowest msgid is 4, 5, 6. The msgids with sequence numbers 4 and 5 are deleted from the done message table, but the msgids with sequence number 6 and higher remain in the table.

At step 340, the browser thread stores the msgids remaining in the done message table (e.g., 6, 8, 9, 10, 11, and 13 in the example above) in an in-memory data structure, and sends those msgids to the prune queue. The lowest of these msgids is denoted min msgid and the highest is denoted max msgid.

At step 350, the browser thread begins browsing the receive queue in order by msgid, starting with the msgid having a sequence number one greater than that of min msgid, and skipping msgids that appear in the in-memory data structure. Once the browser processes all messages for which the msgid is absent from the in-memory data structure between min msgid and max msgid, it may discard the in-memory data structure at step 360 and browse the receive queue without having to check whether messages have already been applied on the target server system.

When a new message identifier sequence is started, a message may be sent to the apply engine to indicate the highest msgid of the old sequence, so that the apply engine knows when it has processed all messages from the old sequence and may begin processing message from the new sequence without applying changes out of order. However, the capture engine may not be able to send an end-of-sequence message that contains the highest msgid. For example, the capture engine may have been restarted and not know the final msgid. Alternatively, a set of messages may be sent to enable the apply engine to infer the highest msgid of the previous sequence.

Figure 4:
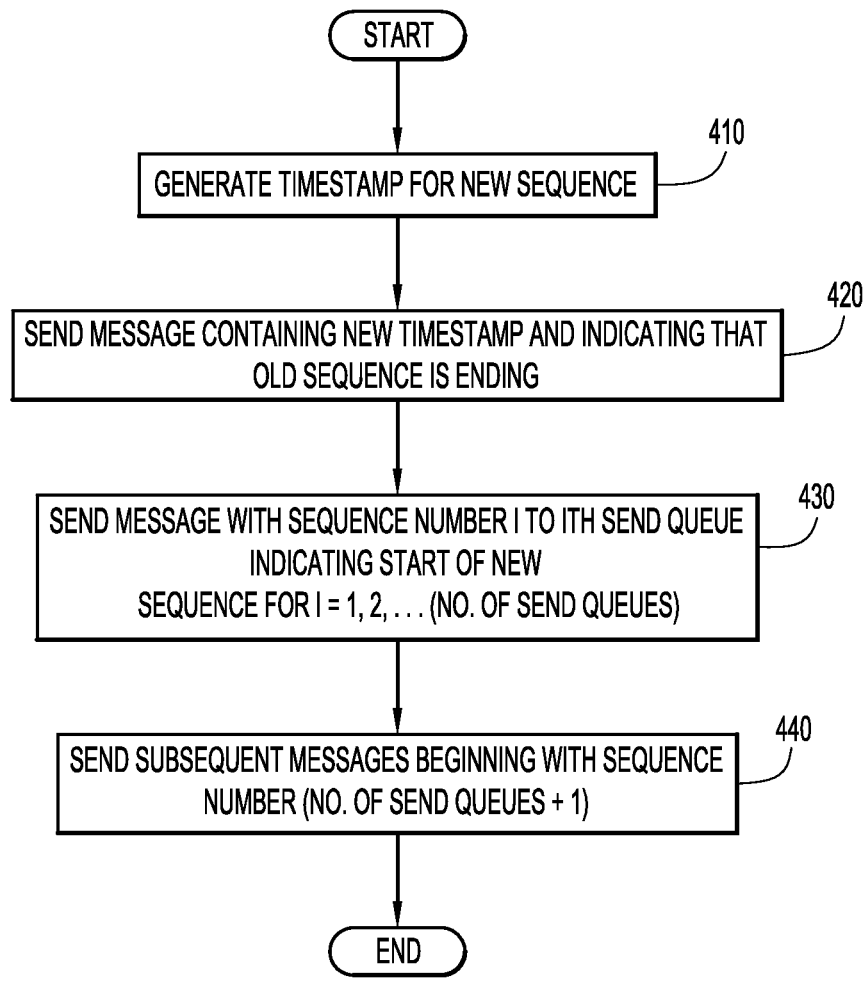
FIG. 4 is a flow diagram illustrating an example manner of starting a new message identifier sequence for a database replication system that uses parallel transaction messages according to an embodiment of the present invention.

An example manner of starting a new message identifier sequence for a database replication system that uses parallel transaction messages according to an embodiment of the present invention is illustrated in FIG. 4. In particular, capture engine 214 generates a timestamp for the new sequence at step 410. At step 420, the capture engine may send a message that contains the new timestamp and indicates that the previous message identifier sequence is ending. At step 430, the capture engine sends a message (referred to as a sequence reset message) to each of the send queues indicating that the new message identifier sequence is starting. Each sequence reset message may include an indicator of the send queue to which it was sent. For example, the capture engine may send a sequence reset message with a msgid sequence number of i to the ith queue for each i from one to the number of send queues. At step 440, the capture engine may begin sending other messages, beginning with a msgid sequence number one greater than the number of send queues.

Figure 5:
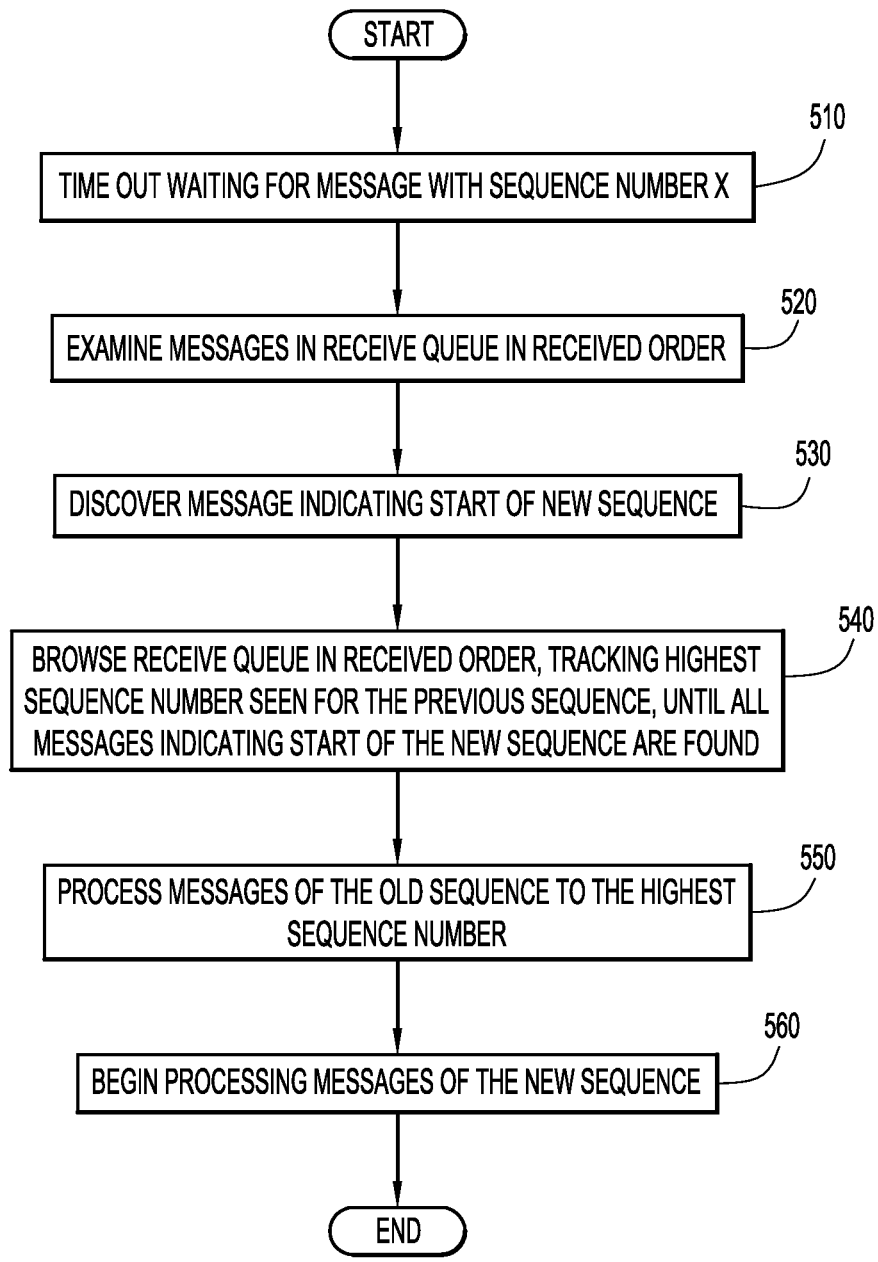
FIG. 5 is a flow diagram illustrating an example manner of responding to a new message identifier sequence for a database replication system that uses parallel transaction messages according to an embodiment of the present invention.

An example manner of responding to a new message identifier sequence for a database replication system that uses parallel transaction messages according to an embodiment of the present invention is illustrated in FIG. 5. Initially, browser thread 225 times out waiting for a message with a sequence number X to appear in the receive queue at step 510. At step 520, the browser thread begins looking at messages in the receive queue in the order in which they were received (e.g., using the browse-next function) to see if a sequence number reset has occurred. At step 530 the browser thread finds a message indicating that a message identifier sequence number is ending. In response, at step 540 the browser thread continues browsing messages in the receive queue in received order—while keeping track of the highest sequence number seen for the previous sequence—until it finds a sequence reset message using the new sequence (indicated by the timestamp) for each send queue. When all of the sequence reset messages have been found, all messages belonging to the previous message identifier sequence have cleared the send queues and arrived at the receive queue, and therefore the browser may infer the final sequence number of the previous sequence. At step 550, the browser retrieves each message of the previous sequence from X to the final sequence number in msgid order (e.g., using the lookup-by-msgid function) and sends those messages to the work queue. Once the browser has processed the final message of the previous sequence, it begins browsing the receive queue for messages belonging to the new sequence at step 560.

One embodiment of the present invention utilizes a general purpose message queuing system configured to perform the operations of queue managers 216 and 226 described above and other tasks (e.g., define the number of send queues and data transmission channels, etc.). For example, a mapping (referred to as a QMAP) may be defined between one dedicated send queue and one administrative queue on the source queue manager and a dedicated receive queue and admin queue on the target queue manager. The administrative queue may be used for administrative messages occasionally sent from the apply engine to the capture engine. The queues are uni-directional. There may be one administrative queue for each capture and for each apply process. Any number of send and receive queues may be defined in a configuration. A send queue on the source queue manager is a remote queue pointing to the receive queue on the target queue manager, and the administrative queue on the target queue manger is a remote queue pointing to the administrative queue on the source queue manager.

A parameter (e.g., NUM_PARALLEL_SENDQS) may be defined as the parallel level for one queue. In a parallel configuration, there will be multiple instances of the following objects (corresponding to the value of NUM_PARALLEL_SENDQS): send queue objects, transmission queue objects for staging data for the send queues, source to target sender channels on the source queue manage, and target from source receiver channels on the target queue manager. The send queue objects all point to the same receive queue on the target. The system may have multiple send queues using the same transmission and sender/receiver channel objects, however this may limit performance gains.

The parameter (NUM_PARALLEL_SENDQS) may be used to define how many remote send queues are utilized by the capture process by publishing to a QMAP. In one embodiment, this parameter is defined for each QMAP defined for a capture process and stored in a table. There can be several QMAPs per capture engine, each with one or more associated send queues.

If NUM_PARALLEL_SENDQS is one, then the capture process will use a base send queue object name listed in a queue control table (e.g., QREP_SENDQUEUES). If the NUM_PARALLEL_SENDQS is greater than one, the capture process will use the base object name to which is appended a sequence number, starting at one and up until the number of parallel send queues.

The number of parallel queues in use may be changed by updating the queue control table (QREP_SENDQUEUES) value and recycling or reinitializing the capture engine. Alternatively, a queue re-initialization command may be issued to cause this process to reload its configuration for each QMAP. There is no need to recycle the apply process unless it is currently not running in a mode that is compatible with multiple send queues. Thus, an embodiment of the present invention may make use of parallel messages transparent to the replication process configuration, and the semantics are of replication are not affected, i.e., transaction-consistency semantics are respected.

To prevent incorrect message browsing behavior, if a QMAP configuration on the capture process side has NUM_PARALLEL_SENDQS>1, but the QMAP configuration on the apply process side has PARALLEL_SENDQS=N, the browser thread reading from the queue may stop with an error once it detects a message sent by capture process when NUM_PARALLEL_SENDQS>1. In response, the QMAP configuration for the affected receive queue may be updated to use NUM_PARALLEL_SENDQS=Y and the browser restarted.

To prevent the apply process running in a mode incompatible with a capture process using parallel messages (e.g., because the apply process starts with an incorrect parameter), the capture process may set a bit in the message header of each message published to a send queue that indicates that the message may be disordered. In this manner, an apply browser may know that capture process is running with parallel messages enabled. This will prevent such an error, and helps to automate the configuration on the target to ensure a browsing thread knows which behavior to use when browsing messages on the receive queue.

It will be appreciated that the embodiments described above and illustrated in the drawings represent only a few of the many ways of implementing embodiments for parallel transaction messages for database replication.

The environment of the present invention embodiments may include any number of computer or other processing systems (e.g., client or end-user systems, server systems, etc.) and storage systems (e.g., file systems, databases, or other repositories), arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., database software, communications software, etc.). These systems may include any types of monitors and input devices (e.g., keyboard, mouse, voice recognition, touch screen, etc.) to enter and/or view information.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among various server systems, end-user/client and/or any other intermediary processing devices including third party client/server processing devices. The software and/or algorithms described above and illustrated in the flow charts may be modified in any manner that accomplishes the functions described herein. In addition, the functions in the flow charts or description may be performed in any order that accomplishes a desired operation.

The communication network may be implemented by any number of any types of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of data storage systems and structures to store information. The data storage systems may be implemented by any number of any conventional or other databases, file systems, caches, repositories, warehouses, etc.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, touch screen, pen, etc.).

It is to be understood that the software of the present invention embodiments could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The present invention embodiments are not limited to the specific tasks, algorithms, parameters, data, or network/environment described above, but may be utilized for system parallel transaction messages for any type of transaction capture application.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method of using parallel transaction messages for database replication comprising:
   receiving in a receive queue transaction messages from a source system via a plurality of parallel send queues each utilizing a different corresponding communication channel to send the transaction messages to the receive queue in parallel, wherein each transaction message corresponds to a separate transaction and includes a message identifier indicating a commit order for that transaction and the transaction messages are received in the receive queue from the different corresponding communication channels out of the commit order, and wherein the transaction messages are distributed to the parallel send queues in groups of a plurality of transaction messages with consecutive message identifiers and received in the receive queue from the parallel send queues as corresponding groups each with a plurality of transaction messages with a different set of consecutive message identifiers;
   reading transaction messages in the receive queue in order of commit against a source database by successively accessing the transaction messages in accordance with consecutive message identifiers, and applying changes described by the transaction messages to a target database to replicate changes to the source database, wherein changes described by the two or more transaction messages in the receive queue are applied to the target database in parallel; and
   deleting transaction messages from the receive queue asynchronously with respect to applying changes described by those transaction messages to the target database.

2. The computer implemented method of claim 1, further comprising:
   writing the message identifier of a transaction message to a done message table as part of a transaction that includes applying changes described by that transaction message to the target database; and
   asynchronously deleting message identifiers from the done message table.

3. The computer implemented method of claim 2, wherein message identifiers in the done message table include a set of lowest contiguous message identifiers, and deleting message identifiers from the done message table comprises deleting the set of lowest contiguous message identifiers excluding a highest message identifier of the set.

4. The computer implemented method of claim 2, further comprising, in response to a restart:
   forming a list of message identifiers in the done message table; and
   reading transaction messages from the receive queue having message identifiers absent from the list and between a minimum and maximum message identifier in the list.

5. The computer implemented method of claim 4, further comprising, in response to the restart, deleting a contiguous range of message identifiers from the done message table.

6. The computer implemented method of claim 1, further comprising:
receiving in the receive queue a sequence reset message from each of the plurality of parallel send queues to indicate an end of a sequence of message identifiers;
identifying the sequence reset messages from each of the plurality of parallel send queues in the receive queue to determine a final sequence number for the sequence; and
processing remaining messages of the sequence based on the final sequence number prior to processing transaction messages of a new sequence.

7. A system for parallel transaction messages for database replication comprising:
at least one processor configured to:
receive in a receive queue transaction messages from a source system via a plurality of parallel send queues each utilizing a different corresponding communication channel to send the transaction messages to the receive queue in parallel, wherein each transaction message corresponds to a separate transaction and includes a message identifier indicating a commit order for that transaction and the transaction messages are received in the receive queue from the different corresponding communication channels out of the commit order, and wherein the transaction messages are distributed to the parallel send queues in groups of a plurality of transaction messages with consecutive message identifiers and received in the receive queue from the parallel send queues as corresponding groups each with a plurality of transaction messages with a different set of consecutive message identifiers;
read transaction messages in the receive queue in order of commit against a source database by successively accessing the transaction messages in accordance with consecutive message identifiers, and apply changes described by the transaction messages to a target database to replicate changes to the source database, wherein changes described by two or more transaction messages in the receive queue are applied to the target database in parallel; and
delete transaction messages from the receive queue asynchronously with respect to applying change described by those transaction messages to the target database.

8. The system of claim 7, wherein the at least one processor is further configured to:
write the message identifier of a transaction message to a done message table as part of a transaction that includes applying changes described by that transaction messages to the target database; and
asynchronously delete message identifiers from the done messages table.

9. The system of claim 8, wherein message identifiers in the done message table include a set of lowest contiguous message identifiers, and deleting message identifiers from the done message table comprises deleting the set of lowest contiguous message identifiers excluding a highest message identifier of the set.

10. The system of claim 8, wherein the at least one processor is further configured to, in response to a restart:
form a list of message identifiers in the done message table; and
read transaction messages from the receive queue having message identifiers absent from the list and between a minimum and maximum message identifier in the list.

11. The system of claim 10, wherein the at least one processor is further configured to, in response to the restart, delete a contiguous range of message identifiers from the done message table.

12. The system of claim 7, wherein the at least one processor is further configured to:
receive in the receive queue a sequence reset message from each of the plurality of parallel send queues to indicate an end of a sequence of message identifiers;
identify the sequence reset messages from each of the plurality of parallel send queues in the receive queue to determine a final sequence number for the sequence; and
process remaining messages of the sequence based on the final sequence number prior to processing transaction messages of a new sequence.

13. A computer program product for parallel transaction messages for database replication comprising:
a computer readable storage medium having computer readable program code embodied therewith for execution on a processing system, the computer readable program code comprising computer readable program code configured to:
receive in a receive queue transaction messages from a source system via a plurality of parallel send queues each utilizing a different corresponding communication channel to send the transaction messages to the receive queue in parallel, wherein each transaction message corresponds to a separate transaction and includes a message identifier indicating a commit order for that transaction and the transaction messages are received in the receive queue from the different corresponding communication channels out of the commit order, and wherein the transaction messages are distributed to the parallel send queues in groups of a plurality of transaction messages with consecutive message identifiers and received in the receive queue from the parallel send queues as corresponding groups each with a plurality of transaction messages with a different set of consecutive message identifiers;
read transaction messages in the receive queue in order of commit against a source database by successively accessing the transaction messages in accordance with consecutive message identifiers, and apply changes described by the transaction messages to a target database to replicate changes to the source database, wherein changes described by two or more transaction messages in the receive queue are applied to the target database in parallel; and
delete transaction messages from the receive queue asynchronously with respect to applying changes described by those transaction messages to the target database.

14. The computer program product of claim 13, wherein the computer readable program code is further configured to:
write the message identifier of a transaction message to a done message table as part of a transaction that includes applying changes described by that transaction message to the target database; and
asynchronously delete message identifiers from the done message table.

15. The computer program product of claim 14, wherein message identifiers in the done messages table include a set of lowest contiguous message identifiers, and deleting message identifiers from the done messages table comprises deleting the identifiers, and deleting message identifiers from the done message table comprises deleting the set of lowest contiguous message identifiers excluding a highest message identifier of the set.

16. The computer program product of claim 14, wherein the computer readable program code is further configured to, in response to a restart:
   form a list of message identifiers in the done message table; and
   read transaction messages from the receive queue having message identifiers absent from the list and between a minimum and maximum message identifier in the list.

17. The computer program product of claim 16, wherein the computer readable program code is further configured to, in response to the restart, delete a contiguous range of message identifiers from the done message table.

18. The computer program product of claim 13, wherein the computer readable program code is further configured to:
   receive in the receive queue a sequence reset message from each of the plurality of parallel send queues to indicate an end of a sequence of message identifiers;
   identify the sequence reset messages from each of the plurality of parallel send queues in the receive queue to determine a final sequence number for the sequence; and
   processing remaining messages of the sequence based on the final sequence number prior to processing transaction messages of a new sequence.

* * * * *